US012777468B2

(12) United States Patent
Wang et al.

(10) Patent No.: US 12,777,468 B2
(45) Date of Patent: Oct. 27, 2026

(54) CHANNEL CODING METHOD AND APPARATUS

(71) Applicant: HUAWEI TECHNOLOGIES CO., LTD., Shenzhen (CN)

(72) Inventors: Xianbin Wang, Hangzhou (CN); Huazi Zhang, Hangzhou (CN); Jiajie Tong, Hangzhou (CN); Rong Li, Boulogne Billancourt (FR); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 279 days.

(21) Appl. No.: 18/672,145

(22) Filed: May 23, 2024

(65) Prior Publication Data

US 2024/0323927 A1 Sep. 26, 2024

Related U.S. Application Data

(63) Continuation of application No. PCT/CN2022/127736, filed on Oct. 26, 2022.

(30) Foreign Application Priority Data

Nov. 24, 2021 (CN) ........................ 202111407594.4

(51) Int. Cl.
*H04W 72/04* (2023.01)

(52) U.S. Cl.
CPC .................................. *H04W 72/04* (2013.01)

(58) Field of Classification Search
None
See application file for complete search history.

(56) References Cited

U.S. PATENT DOCUMENTS

2019/0081732 A1* 3/2019 Dai ....................... H04L 1/0057
2019/0229751 A1* 7/2019 Kim .................. H03M 13/1188

FOREIGN PATENT DOCUMENTS

CN 102244521 A 11/2011
DE 102011006875 A1 10/2012

OTHER PUBLICATIONS

Lih-Jyh Weng, "Decomposition of M-Sequences and Its Applications," IEEE Transactions on Information Theory, vol. IT-17, No. 4, Jul. 1971; pp. 457-463 (7 total pages).

Ken R. Duffy et al: "Capacity-achieving Guessing Random Additive Noise Decoding (GRAND)," arXiv:1802.07010v5 [cs.IT] Mar. 22, 2019, total 21 pages.

Marc P. C. Fossorier et al: "Soft-Decision Decoding of Linear Block Codes Based on Ordered Statistics," Sep. 1995, total 18 pages.

* cited by examiner

*Primary Examiner* — Walter J Divito
(74) *Attorney, Agent, or Firm* — Rimon PC

(57) ABSTRACT

Embodiments of this application disclose a channel coding method and apparatus. The method includes: obtaining a subsequence based on a first sequence and a second sequence; and determining a generator polynomial or a generator matrix based on the subsequence, where the generator polynomial or the generator matrix is used for cyclic code encoding. According to embodiments of this application, generator polynomials or generator matrices for channel coding of different lengths and different bit rates are determined by using two sequences, so that storage space is reduced, and storage complexity is reduced.

20 Claims, 2 Drawing Sheets

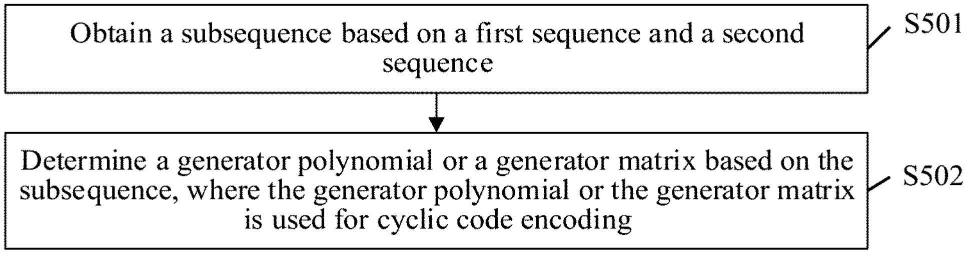
FIG. 5
Binary sequence A: 0 0 0 1 0 0 1 1 0 1 0 1 0 0 0 1 1 0 0 1
Sequence B: 0 0 3 2 3 4 1 7 12
FIG. 6
Binary sequence A: 1 0 1 1 0 0 1
Sequence B: 6 4 3 −5 1 2 7
FIG. 7
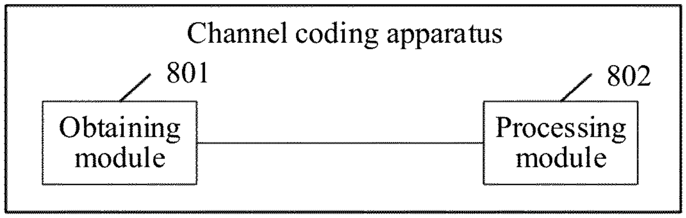
FIG. 8
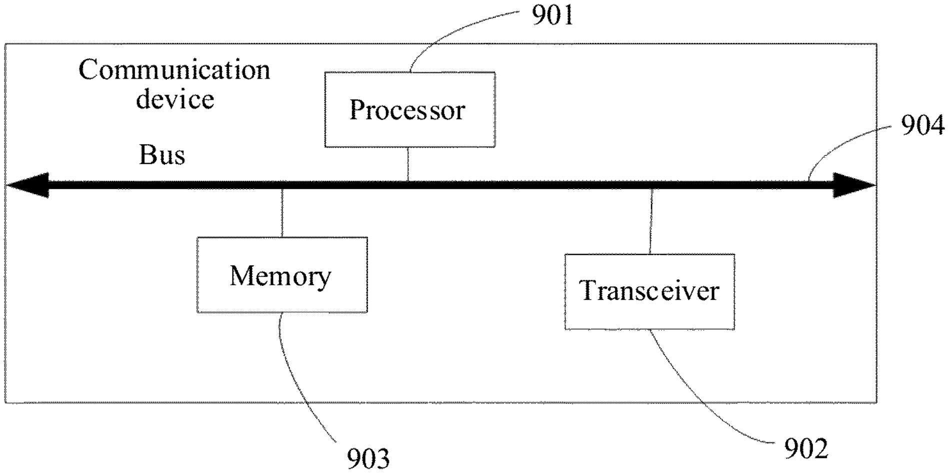
FIG. 9

CHANNEL CODING METHOD AND APPARATUS

CROSS-REFERENCE TO RELATED APPLICATIONS

This disclosure is a continuation of International Application No. PCT/CN2022/127736, filed on Oct. 26, 2022, which claims priority to Chinese Patent Application No. 202111407594.4, filed on Nov. 24, 2021. The disclosures of the aforementioned applications are hereby incorporated by reference in their entireties.

TECHNICAL FIELD

This application relates to the field of communication technologies, and in particular, to a channel coding method and apparatus.

BACKGROUND

As a key technology in the communication field, a channel coding technology is used to protect data during data transmission and recover data in the presence of an error. In wireless communication, because a channel, a resource, and the like change greatly, a plurality of channel coding configurations with different code lengths and different bit rates usually need to be supported. Based on different construction ideas, the channel coding technology may be classified into structural coding and random coding. Structural coding and random coding have respective advantages and disadvantages. During random coding, complexity of storage space is high.

SUMMARY

Embodiments of this application provide a channel coding method and apparatus, to determine, by using two sequences, generator polynomials or generator matrices for channel coding of different lengths and different bit rates, to perform channel coding, so that storage space is saved, and storage complexity is reduced.

According to a first aspect, an embodiment of this application provides a channel coding method. The method includes: obtaining a subsequence based on a first sequence and a second sequence; and determining a generator polynomial or a generator matrix based on the subsequence, where the generator polynomial or the generator matrix is used for cyclic code encoding. Generator polynomials or generator matrices for channel coding of different lengths and different bit rates are determined by using two sequences, to perform channel coding, so that storage space is reduced, and storage complexity is reduced.

In a possible design, a first value in the second sequence is obtained; and the subsequence is obtained from the first sequence based on the first value. Different subsequences are obtained from the prestored first sequence to construct generator polynomials or generator matrices for channel coding of different lengths and different bit rates, so that storage complexity is reduced.

In another possible design, L is determined based on a code length N and an information bit length K, where L=N−K, and all of K, L, and N are positive integers; and a value at a location corresponding to L is read, from the second sequence, as a first value M, where M is a positive integer. The first value is obtained from the second sequence, and then the subsequence is obtained from the first sequence by using the first value, to obtain a plurality of different subsequences, so that diversity of the generator polynomial or the generator matrix is ensured.

In another possible design, L−1 bits are read starting from an $M^{th}$ bit in the first sequence as the subsequence, where M is the first value.

In another possible design, L is determined based on a code length N and an information bit length K, where L=N−K−1; and at least one value whose absolute value is less than or equal to L is read, from the second sequence, as at least one first value. At least one first value is obtained from the second sequence, and then the subsequence is obtained from the first sequence by using the at least one first value, to obtain a plurality of different subsequences, so that diversity of the generator polynomial or the generator matrix is ensured.

In another possible design, one value in the second sequence corresponds to one bit in the first sequence; and a bit corresponding to the at least one first value is read, from the first sequence, as the subsequence.

In another possible design, one bit 1 is separately added before the subsequence and after the subsequence to obtain the generator polynomial. The generator polynomial is represented by using a generator polynomial vector. The generator polynomial is constructed by adding bits before and after the subsequence, to perform random coding, so that system communication confidentiality is improved.

In another possible design, the subsequence is reversed to obtain a reversed subsequence; and one bit 1 is separately added before the reversed subsequence and after the reversed subsequence to obtain the generator polynomial. The generator polynomial is represented by using a generator polynomial vector. The generator polynomial is constructed by reversing the subsequence and adding bits before and after the reversed subsequence, to perform random coding, so that system communication confidentiality is improved.

According to a second aspect, an embodiment of this application provides a channel coding apparatus, including:

- an obtaining module, configured to obtain a subsequence based on a first sequence and a second sequence; and
- a processing module, configured to determine a generator polynomial or a generator matrix based on the subsequence, where the generator polynomial or the generator matrix is used for cyclic code encoding.

In a possible design, the obtaining module is further configured to obtain a first value in the second sequence; and the processing module is further configured to obtain the subsequence from the first sequence based on the first value.

In another possible design, the processing module is further configured to: determine L based on a code length N and an information bit length K, where L=N−K, and all of K, L, and N are positive integers; and read, from the second sequence, a value at a location corresponding to L as a first value M, where M is a positive integer.

In another possible design, the processing module is further configured to read L−1 bits starting from an $M^{th}$ bit in the first sequence as the subsequence, where M is the first value.

In another possible design, the processing module is further configured to: determine L based on a code length N and an information bit length K, where L=N−K−1, and all of K, L, and N are positive integers; and read, from the second sequence, at least one value whose absolute value is less than or equal to L as at least one first value.

In another possible design, the processing module is further configured to read, from the first sequence, a bit corresponding to the at least one first value as the subsequence.

In another possible design, the processing module is further configured to separately add one bit 1 before the subsequence and after the subsequence to obtain the generator polynomial. The generator polynomial is represented by using a generator polynomial vector.

In another possible design, the processing module is further configured to: reverse the subsequence to obtain a reversed subsequence; and separately add one bit 1 before the reversed subsequence and after the reversed subsequence to obtain the generator polynomial. The generator polynomial is represented by using a generator polynomial vector.

For operations performed by the channel coding apparatus and beneficial effects, refer to the method and the beneficial effects in the first aspect. Details are not described again.

According to a third aspect, an embodiment of this application provides a channel coding apparatus. The channel coding apparatus is configured to implement the method and the function performed by a terminal device in the first aspect, and is implemented by hardware/software. The hardware/software includes a module corresponding to the foregoing function.

According to a fourth aspect, this application provides a channel coding apparatus. The apparatus may be a terminal device or a network device, may be an apparatus in a terminal device or a network device, or may be an apparatus that can be used together with a terminal device or a network device. The channel coding apparatus may alternatively be a chip system. The channel coding apparatus may perform the method according to the first aspect. A function of the channel coding apparatus may be implemented by hardware, or may be implemented by hardware by executing corresponding software. The hardware or the software includes one or more modules corresponding to the function. The module may be software and/or hardware. For operations performed by the channel coding apparatus and beneficial effects, refer to the method and the beneficial effects in the first aspect. Details are not described again.

According to a fifth aspect, this application provides a channel coding apparatus. The channel coding apparatus includes a processor, and when the processor invokes a computer program in a memory, the method according to any one of the designs of the first aspect is performed.

According to a sixth aspect, this application provides a channel coding apparatus. The channel coding apparatus includes a processor and a memory, the memory is configured to store computer-executable instructions, and the processor is configured to execute the computer-executable instructions stored in the memory, so that the channel coding apparatus performs the method according to any one of the designs of the first aspect.

According to a seventh aspect, this application provides a channel coding apparatus. The channel coding apparatus includes a processor, a memory, and a transceiver. The transceiver is configured to receive a channel or a signal or send a channel or a signal. The memory is configured to store a computer program. The processor is configured to invoke the computer program from the memory to perform the method according to any one of the designs of the first aspect.

According to an eighth aspect, this application provides a channel coding apparatus. The channel coding apparatus includes a processor and an interface circuit, the interface circuit is configured to receive a computer program and transmit the computer program to the processor, and the processor runs the computer program to perform the method according to any one of the designs of the first aspect.

According to a ninth aspect, this application provides a computer-readable storage medium. The computer-readable storage medium is configured to store a computer program, and when the computer program is executed, the method according to any one of the designs of the first aspect is implemented.

According to a tenth aspect, this application provides a computer program product including a computer program. When the computer program is executed, the method according to any one of the designs of the first aspect is implemented.

According to an eleventh aspect, an embodiment of this application provides a communication system. The communication system includes at least one terminal device and at least one network device, and the terminal device or the network device is configured to perform the method according to any one of the designs of the first aspect.

BRIEF DESCRIPTION OF DRAWINGS

To describe the technical solutions in embodiments of this application or in the background more clearly, the following briefly describes the accompanying drawings needed for embodiments of this application or the background.

FIG. 5 is a schematic flowchart of a channel coding method according to an embodiment of this application;

FIG. 6 is a diagram of a first sequence and a second sequence according to an embodiment of this application;

FIG. 7 is a diagram of another first sequence and second sequence according to an embodiment of this application;

FIG. 8 is a diagram of a structure of a channel coding apparatus according to an embodiment of this application; and FIG. 9 is a diagram of a structure of a communication device according to an embodiment of this application.

DESCRIPTION OF EMBODIMENTS

The following describes embodiments of this application with reference to the accompanying drawings in embodiments of this application.

Figure 1:
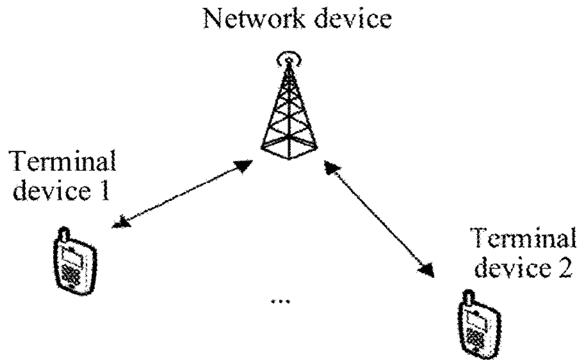
FIG. 1 is a diagram of a structure of a communication system according to an embodiment of this application.

FIG. 1 is a diagram of a structure of a communication system according to an embodiment of this application. The communication system may include a network device and a terminal device (for example, a terminal device 1 and a terminal device 2). The network device provides a communication service for the terminal device. The network device may send downlink data to the terminal device. The downlink data is protected through channel coding. The terminal device sends uplink data to the network device. The uplink data may also be protected through channel coding.

The communication system may include one or more cells, and each cell includes one or more network devices. The network device may be a base station, and the base station includes a baseband unit (BBU) and a remote radio unit (RRU). The BBU and the RRU may be placed at different places. For example, the RRU is remote and placed in a heavy-traffic area, and the BBU is placed in a central equipment room. Alternatively, the BBU and the RRU may be placed in a same equipment room. Alternatively, the BBU and the RRU may be different components at a same rack. The network device may alternatively be an access point, a relay node, a base transceiver station (BTS), a NodeB (NB), an evolved NodeB (eNB), or a next generation NodeB (gNB) in 5G. The terminal device may be user equipment, may be a device that provides a voice and/or data connection to a user, or may be a computing device connected to a laptop computer, a desktop computer, or the like. For example, the terminal device is a smartphone, a personal digital assistant (PDA), an in-vehicle mobile apparatus, a wearable device, a virtual reality/augmented reality (VR/AR) device, or any internet of things (IoT) device.

The communication system in embodiments of this application includes but is not limited to a narrowband-internet of things (NB-IoT) system, a global system for mobile communications (GSM), an enhanced data rate for GSM evolution (EDGE) system, a wideband code division multiple access (WCDMA) system, a code division multiple access 2000 (CDMA2000) system, a time division-synchronous code division multiple access (TD-SCDMA) system, a long term evolution (LTE) system, and three application scenarios of a next-generation 5G mobile communication system: enhanced mobile broadband (eMBB), ultra-reliable low-latency communication (URLLC), and enhanced machine type communication (eMTC).

Figure 2:
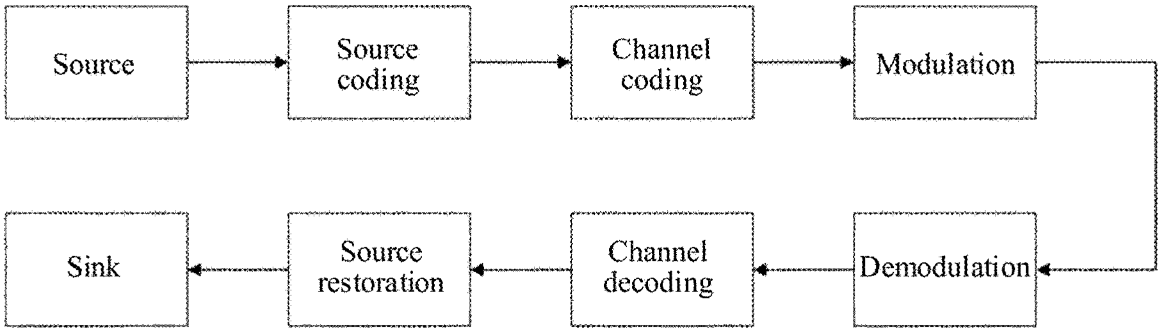
FIG. 2 is a diagram of another communication system according to an embodiment of this application.

Some embodiments of this application may be implemented by using a dedicated chip, such as an application-specific integrated circuit (ASIC) or a programmable chip, such as a field programmable gate array (FPGA), or may be implemented by using software (program code in a memory). Channel coding and modulation, and channel decoding and demodulation are mainly involved. FIG. 2 is a diagram of another communication system according to an embodiment of this application. A transmit end first codes a source, then performs channel coding and modulation, and sends a signal obtained after modulation. After receiving the signal obtained after modulation, a receive end first performs channel demodulation and decoding, and then performs source restoration to obtain a sink.

For a channel coding technology, channel coding performance depends on a code spectrum and a decoding algorithm. The code spectrum is a distance spectrum distribution between different codewords. It may be understood that a better code spectrum (that is, a longer codeword distance) indicates better error correction performance of a code. The decoding algorithm is a process of restoring an initial codeword from a received symbol sequence with an error. A decoding algorithm with lower complexity is easier to implement.

Based on different construction ideas, the channel coding technology may be classified into structural coding and random coding. Structural coding refers to performing a specific structural design on a code. Random coding means that a special structure of a code is not limited, and even a code structure is directly constructed based on a random process. Structural coding and random coding have respective advantages and disadvantages. For structural coding, due to a specific code structure, decoding may usually be performed by using some decoding algorithms with low complexity. For random coding, because construction of random coding does not have a special limitation on a structure, space constructed by random coding is larger than that constructed by structural coding, and a code distance of random coding is usually larger.

In a current communication system, due to a limitation of complexity of a decoding algorithm, coding used is usually structural coding, and a dedicated decoding algorithm is used together. For example, a polar code, a low-density parity-check code (LDPC), or a Bose Chaudhuri Hocquenghem (BCH) code is used. Corresponding decoding algorithms are a successive cancellation decoding algorithm, a confidence propagation decoding algorithm, a Berlekamp-Massey decoding algorithm, and the like.

When random coding is used, a general decoding algorithm may be used for decoding. However, a current general decoding algorithm is highly complex and has low cost-effectiveness. With the progress of research, complexity of the general decoding algorithm is gradually decreasing. When the complexity of the general decoding algorithm is acceptable, advantages of random coding in terms of a code spectrum can be fully explored. When random coding and the general decoding algorithm are used, a new manner is introduced to communication system design.

Figure 3:
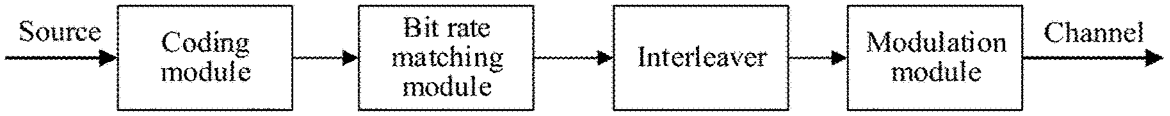
FIG. 3 is a diagram of a coding model based on structural coding.

FIG. 3 is a diagram of a coding model based on structural coding. As shown in FIG. 3, the coding model includes a coding module, a bit rate matching module, an interleaver, and a modulation module. Currently, various coding schemes designed based on structures have the following limitations:

1. A polar code and a Reed-Muller (RM) code are used as an example. Because these codes are limited by code structures, the codes are usually limited by mother code lengths. For example, for the polar code or the RM code, the mother code length is $2^m$, for example, 64, 128, or 256. For a BCH code, a mother code length is $2^{m-1}$, for example, 7, 15, or 31.

2. In a decoding algorithm for structural coding, some assumptions about noise need to be made, for example, noise is uniformly distributed and independent.

Due to the foregoing limitations, when structural coding is used, a rate matching module needs to be used to adapt to a channel length requirement, and the interleaver needs to be used to disturb interference. Compared with random coding, structural coding is limited, which leads to a high bit error rate. The following uses a random coding manner to perform channel coding.

Figure 4:
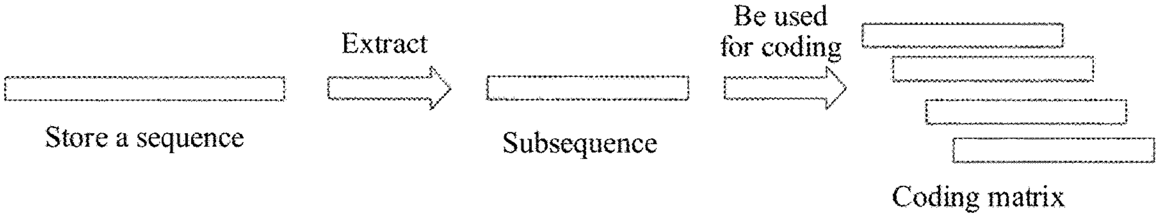
FIG. 4 is a diagram of a single-sequence-based channel coding method according to an embodiment of this application.

FIG. 4 is a diagram of a single-sequence-based channel coding method according to an embodiment of this application. The method mainly includes the following steps: first, a sequence is stored, and during random coding, a subsequence is extracted from the stored sequence according to a rule. Then a generator polynomial or a generator matrix for a cyclic code is determined based on the subsequence. Finally, channel coding is performed based on the generator polynomial and the generator matrix to obtain a coding matrix. The following describes an example implementation process of channel coding.

FIG. 5 is a schematic flowchart of a channel coding method according to an embodiment of this application. The method includes at least the following steps.

S501: obtain a subsequence based on a first sequence and a second sequence.

The first sequence may be a binary sequence, and the first sequence may be prestored. The second sequence may include a plurality of values, and the value in the second sequence may be greater than 0, or may be less than or equal to 0.

A quantity of bits in the first sequence is the same as a quantity of values in the second sequence, and one value in the second sequence corresponds to one bit in the first sequence. The quantity of bits in the first sequence may alternatively be different from the quantity of values in the second sequence.

Optionally, a first value in the second sequence may be obtained; and the subsequence may be obtained from the first sequence based on the first value. This step may include the following several optional manners.

In an optional manner, L may be determined based on a code length N and an information bit length K, where L=N−K, and all of K, L, and N are positive integers; and a value at a location corresponding to L may be read, from the second sequence, as a first value M. L−1 bits are read starting from an $M^{th}$ bit in the first sequence as the subsequence, where M is the first value, and M is a positive integer.

For example, as shown in FIG. 6, the first sequence is a binary sequence A: 0001001101010100011001, and the second sequence is a sequence B: 0, 0, 3, 2, 3, 4, 1, 7, 12. If the code length N is equal to 24, and the information bit length K is equal to 16, L=24−16=8. The eighth value is read from the sequence B, and it may be determined that the eighth value in the sequence B is 7. Therefore, seven bits are read starting from the seventh bit in the binary sequence A, and finally, a subsequence 1101010 is obtained.

In another optional manner, L may be determined based on a code length N and an information bit length K, where L=N−K−1, and all of K, L, and N are positive integers; and at least one value whose absolute value is less than or equal to L may be read, from the second sequence, as at least one first value. Then a bit corresponding to the at least one first value is read, from the first sequence, as the subsequence. One value in the second sequence corresponds to one bit in the first sequence.

For example, as shown in FIG. 7, the first sequence is a binary sequence A: 1011001, and the second sequence is a sequence B: 6, 4, 3, −5, 1, 2, 7. Each value in the sequence B corresponds to each bit in the binary sequence A, the first value 6 in the sequence B corresponds to the first bit 1 in the binary sequence A, the second value 4 in the sequence B corresponds to the second bit 0 in the binary sequence A, . . . . If the code length N is equal to 24, and the information bit length K is equal to 16, L=24−18−1−5. Values whose absolute values are less than or equal to 5 are read from the sequence B, and an obtained value set includes {4, 3, −5, 1, 2}. The value set {4, 3, −5, 1, 2} respectively corresponds to the second bit to the sixth bit in the binary sequence. Therefore, the second bit to the sixth bit are read from the binary sequence A, and finally, a subsequence 01100 is obtained.

S502: determine a generator polynomial or a generator matrix based on the subsequence, where the generator polynomial or the generator matrix is used for cyclic code encoding.

Optionally, one bit 1 may be separately added before the subsequence and after the subsequence to obtain the generator polynomial. The generator polynomial is represented by using a generator polynomial vector.

For example, as shown in FIG. 6, the subsequence 1101010 is obtained based on the binary sequence A: 00010011010100011001 and the sequence B: 0, 0, 3, 2, 3, 4, 1, 7, 12. One bit 1 may be separately added before and after the subsequence 1101010 to obtain a generator polynomial 111010101.

Optionally, the subsequence is reversed to obtain a reversed subsequence; and one bit 1 is separately added before the reversed subsequence and after the reversed subsequence to obtain the generator polynomial. The generator polynomial is represented by using a generator polynomial vector.

Further, after the at least one value whose absolute value is less than or equal to L is read, from the second sequence, as the at least one first value, it may be determined whether a value whose absolute value is equal to L in the at least one read first value is greater than 0. If the value is greater than 0, the subsequence is not reversed, and one bit 1 is separately added before the subsequence and after the subsequence to obtain the generator polynomial. If the value is not greater than 0, the subsequence is reversed, and one bit 1 is separately added before the reversed subsequence and after the reversed subsequence to obtain the generator polynomial.

For example, as shown in FIG. 7, the subsequence 01100 is obtained based on the binary sequence A: 1011001 and the sequence B: 6, 4, 3, −5, 1, 2, 7. Because a value whose absolute value is equal to 5 in the sequence B is −5, and −5 is less than 0, the subsequence 01100 is reversed to obtain a reversed subsequence 00110, and then one bit 1 is separately added before and after the reversed subsequence 00110 to obtain a generator polynomial 1001101.

Optionally, a cyclic code may be determined based on the generator polynomial or the generator matrix. The generator matrix may be obtained by using the generator polynomial.

It should be noted that the foregoing steps may be performed by a terminal device, and correspondingly, a network device performs channel decoding; or the foregoing steps may be performed by a network device, and correspondingly, a terminal device performs channel decoding. A channel coding process is opposite to a channel decoding process. For the channel decoding process, refer to the channel coding process. Details are not described herein again. A process of performing channel decoding according to the foregoing method also falls within the protection scope of this application.

In some embodiments of this application, generator polynomials or generator matrices for channel coding of different lengths and different bit rates are determined by using two sequences, so that storage space is reduced, and storage complexity is reduced.

It may be understood that in the foregoing method embodiments, methods and operations implemented by the terminal device may alternatively be implemented by a component (for example, a chip or a circuit) that may be used in the terminal device, and methods and operations implemented by the network device may alternatively be implemented by a component (for example, a chip or a circuit) that may be used in the network device.

The foregoing mainly describes the solutions provided in embodiments of this application from a perspective of interaction between the devices. It may be understood that to implement the foregoing functions, each network element such as a transmit-end device or a receive-end device includes a corresponding hardware structure and/or software module for performing each function. A person skilled in the art may be aware that with reference to the examples described in embodiments disclosed in this specification, units and algorithm steps can be implemented by hardware or a combination of computer software and hardware in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, function modules of the terminal device or the network device may be obtained through division based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that in embodiments of this application, division into the modules is an example, and is merely logical function division. During actual implementation, there may be another division manner. Descriptions are provided below by using an example in which each function module is obtained through division based on each corresponding function.

The foregoing describes in detail the method provided in embodiments of this application with reference to FIG. 5. The following describes in detail a channel coding apparatus provided in embodiments of this application with reference to FIG. 8. It should be understood that descriptions of apparatus embodiments correspond to the descriptions of the method embodiments. Therefore, for content that is not described in detail, refer to the foregoing method embodiments. For brevity, details are not described herein again.

FIG. 8 is a diagram of a structure of a channel coding apparatus according to an embodiment of this application. The channel coding apparatus may include an obtaining module 801, which may comprise a circuit (obtaining module circuit), and a processing module 802, which may also comprise a circuit (processing module circuit). The obtaining module 801 may communicate with the outside, and the processing module 802 is configured to perform processing, for example, determine a generator polynomial or a generator matrix. The obtaining module 801 may also be referred to as a communication interface, a transceiver unit, or a transceiver module. The obtaining module 801 may be configured to perform actions performed by the terminal device or the network device in the foregoing method embodiments.

For example, the obtaining module 801 may also be referred to as a transceiver module or a transceiver unit (including a receiving unit and/or a sending unit), and is separately configured to perform sending and receiving steps of the terminal device or the network device in the foregoing method embodiments.

In a possible design, the channel coding apparatus may implement steps or procedures performed by the terminal device or the network device in the foregoing method embodiments, for example, may be a terminal device, or a chip or a circuit configured in the terminal device or the network device. The obtaining module 801 is configured to perform sending/receiving related operations of the terminal device or the network device in the foregoing method embodiments, and the processing module 802 is configured to perform processing related operations of the terminal device or the network device in the foregoing method embodiments.

The obtaining module 801 is configured to obtain a subsequence based on a first sequence and a second sequence.

The processing module 802 is configured to determine a generator polynomial or a generator matrix based on the subsequence. The generator polynomial or the generator matrix is used for cyclic code encoding.

Optionally, the obtaining module 801 is further configured to obtain a first value in the second sequence; and the processing module 802 is further configured to obtain the subsequence from the first sequence based on the first value.

Optionally, the processing module 802 is further configured to: determine L based on a code length N and an information bit length K, where L=N−K, and all of K, L, and N are positive integers; and read, from the second sequence, a value at a location corresponding to L as a first value M, where M is a positive integer.

Optionally, the processing module 802 is further configured to read L−1 bits starting from an $M^{th}$ bit in the first sequence as the subsequence, where M is the first value.

Optionally, the processing module 802 is further configured to: determine L based on a code length N and an information bit length K, where L=N−K−1, and all of K, L, and N are positive integers; and read, from the second sequence, at least one value whose absolute value is less than or equal to L as at least one first value.

Optionally, one value in the second sequence corresponds to one bit in the first sequence; and the processing module 802 is further configured to read, from the first sequence, a bit corresponding to the at least one first value as the subsequence.

Optionally, the processing module 802 is further configured to separately add one bit 1 before the subsequence and after the subsequence to obtain the generator polynomial. The generator polynomial is represented by using a generator polynomial vector.

Optionally, the processing module 802 is further configured to: reverse the subsequence to obtain a reversed subsequence; and separately add one bit 1 before the reversed subsequence and after the reversed subsequence to obtain the generator polynomial. The generator polynomial is represented by using a generator polynomial vector.

It should be noted that for implementation of the modules, refer to corresponding descriptions in the method embodiment shown in FIG. 5, to perform the methods and functions performed by the terminal device or the network device in the foregoing embodiments.

FIG. 9 is a diagram of a structure of a communication device according to an embodiment of this application. The communication device may be a terminal device or a network device. The communication device may be used in the system shown in FIG. 1, to perform functions of the terminal device or the network device in the foregoing method embodiments, or implement steps or procedures performed by the terminal device or the network device in the foregoing method embodiments.

As shown in FIG. 9, the communication device includes a processor 901 and a transceiver 902. Optionally, the communication device further includes a memory 903. The processor 901, the transceiver 902, and the memory 903 may communicate with each other through an internal connection path, to transfer a control signal and/or a data signal. The memory 903 is configured to store a computer program. The processor 901 is configured to invoke the computer program from the memory 903 and run the computer program, to control the transceiver 902 to send/receive a signal. Optionally, the communication device may further include an antenna, configured to send, through a radio signal, uplink data or uplink control signaling output by the transceiver 902.

The processor 901 and the memory 903 may be combined into one processing apparatus, and the processor 901 is configured to execute program code stored in the memory 903 to implement the foregoing functions. The memory 903 may be integrated into the processor 901, or may be independent of the processor 901. The processor 901 may correspond to the processing module in FIG. 8.

The transceiver 902 may correspond to the obtaining module in FIG. 8, and may also be referred to as a transceiver unit or a transceiver module. The transceiver 902 may include a receiver (also referred to as a receiver circuit) and a transmitter (also referred to as a transmitter circuit). The receiver is configured to receive a signal, and the transmitter is configured to transmit a signal.

It should be understood that the communication device shown in FIG. 9 can implement processes related to the communication device in the method embodiment shown in FIG. 5. Operations and/or functions of the modules in the communication device are separately intended to implement corresponding procedures in the foregoing method embodiments. For details, refer to the descriptions in the foregoing method embodiments. To avoid repetition, detailed descriptions are properly omitted herein.

The processor 901 may be configured to perform an action that is internally implemented by the communication device and that is described in the foregoing method embodiments, and the transceiver 902 may be configured to perform an action, described in the foregoing method embodiments, of performing sending by the communication device to the network device or performing reception by the communication device from the network device. For details, refer to the descriptions in the foregoing method embodiments. Details are not described herein again.

The processor 901 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor 901 may be a combination of processors implementing a computing function, for example, a combination of one or more microprocessors or a combination of a digital signal processor and a microprocessor. The communication bus 904 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 9, but this does not mean that there is only one bus or only one type of bus. The communication bus 904 is configured to implement communication connections between these components. The transceiver 902 in some embodiments of this application is configured to perform signaling or data communication with another node device. The memory 903 may include a volatile memory, for example, a nonvolatile dynamic random-access memory (NVRAM), a phase change random-access memory (PRAM), or a magnetoresistive random-access memory (MRAM). The memory 903 may further include a nonvolatile memory, for example, at least one magnetic disk storage device, an electrically erasable programmable read-only memory (EEPROM), a flash memory device such as a NOR flash memory or a NAND flash memory (NAND flash memory), or a semiconductor device such as a solid state disk SSD. Optionally, the memory 903 may be at least one storage apparatus far away from the processor 901. Optionally, the memory 903 may further store a group of computer program code or configuration information. Optionally, the processor 901 may further execute the program stored in the memory 903. The processor may cooperate with the memory and the transceiver to perform any method and function of the communication device in the foregoing embodiments of this application.

An embodiment of this application further provides a chip system. The chip system includes a processor, configured to support a terminal device or a network device in implementing a function in any one of the foregoing embodiments, for example, generating or processing a generator polynomial or a generator matrix in the foregoing method. In a possible design, the chip system may further include a memory, and the memory is configured to store program instructions and data for the terminal device or the network device. The chip system may include a chip, or may include a chip and another discrete component. Input and output of the chip system respectively correspond to receiving and sending operations of the terminal device or the network device in the method embodiments.

An embodiment of this application further provides a processing apparatus, including a processor and an interface. The processor may be configured to perform the method in the foregoing method embodiments.

It should be understood that the processing apparatus may be a chip. For example, the processing apparatus may be an FPGA, an ASIC, a system on chip (SoC), a central processing unit (CPU), a network processor (NP), a digital signal processing circuit (DSP), a microcontroller (MCU), a programmable controller (PLD), or another integrated chip.

In an implementation process, the steps in the foregoing methods may be implemented by using an integrated logical circuit of hardware in the processor or by using instructions in a form of software. The steps of the methods disclosed with reference to embodiments of this application may be directly performed and completed by a hardware processor, or may be performed and completed by using a combination of hardware in the processor and a software module. The software module may be located in a storage medium, such as a random-access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that the processor in embodiments of this application may be an integrated circuit chip, and has a signal processing capability. In an implementation process, the steps in the foregoing method embodiments may be implemented by using an integrated logical circuit of hardware in the processor or by using instructions in a form of software. The processor may be a general-purpose processor, a DSP, an ASIC, an FPGA or another programmable logic device, a discrete gate or a transistor logic device, or a discrete hardware component. The processor may implement or perform the methods, the steps, and the logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of hardware in the decoding processor and a software module. The software module may be located in a storage medium in the art, such as a random-access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

According to the methods provided in embodiments of this application, this application further provides a computer program product. The computer program product includes a computer program, and when the computer program runs on a computer, the computer is enabled to perform the method in any one of the embodiments shown in FIG. 5.

According to the methods provided in embodiments of this application, this application further provides a computer-readable medium. The computer-readable medium stores a computer program, and when the computer program runs on a computer, the computer is enabled to perform the method in any one of the embodiments shown in FIG. 5.

According to the methods provided in embodiments of this application, this application further provides a communication system. The communication system includes one or more terminal devices and one or more network devices that are described above.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, an SSD), or the like.

The network device and the terminal device in the foregoing apparatus embodiments correspond to the network device or the terminal device in the method embodiments, and corresponding modules or units perform corresponding steps. For example, a receiving module and a sending module (transceiver) perform receiving or sending steps in the method embodiments, and steps other than sending and receiving may be performed by the processing module (processor). For a function of a module, refer to a corresponding method embodiment. There may be one or more processors.

Terminologies such as "component", "module", and "system" used in this specification are used to indicate computer related entities, hardware, firmware, combinations of hardware and software, software, or software being executed. For example, the component may be but is not limited to a process that runs on a processor, a processor, an object, an executable file, a thread of execution, a program, and/or a computer. As illustrated by using figures, both a computing device and an application that runs on the computing device may be components. One or more components may reside within a process and/or a thread of execution, and the components may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that various illustrative logical blocks and steps described with reference to embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

For the purpose of convenient and brief description, details are not described herein again. For a detailed working process of the foregoing system, apparatus, and unit, refer to a corresponding process in the foregoing method embodiments.

In the several embodiments provided in this application, it should be understood that the disclosed system, apparatus, and method may be implemented in other manners. For example, the described apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or other forms.

The units described as separate parts may or may not be physically separate, and parts displayed as units may or may not be physical units, and may be located at one position, or may be distributed on a plurality of network units. Some or all of the units may be selected based on actual requirements to achieve the objectives of the solutions of embodiments.

In addition, function modules in this application may be integrated into one processing module, or each of the modules may exist alone physically, or two or more modules may be integrated into one module.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random-access memory (RAM), a magnetic disk, or an optical disc.

The foregoing descriptions are merely some implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel coding method, comprising:

obtaining a subsequence based on a first sequence and a second sequence by obtaining a first value in the second sequence and obtaining the subsequence from the first sequence based on the first value;

determining a generator polynomial or a generator matrix based on the subsequence; and performing, by an apparatus, cyclic code encoding using the generator polynomial or the generator matrix.

2. The method according to claim 1, wherein the obtaining the first value in the second sequence comprises:

determining L based on a code length N and an information bit length K, wherein L=N−K, and K, L, and N are positive integers; and reading, from the second sequence, a value at a location corresponding to L as a first value M, wherein M is a positive integer.

3. The method according to claim 1, wherein the obtaining the subsequence from the first sequence based on the first value comprises:

reading L−1 bits starting from an $M^{th}$ bit in the first sequence as the subsequence, wherein M is the first value.

4. The method according to claim 1, wherein the obtaining the first value in the second sequence comprises:

determining L based on a code length N and an information bit length K, wherein L=N−K−1, and K, L, and N are positive integers; and reading, from the second sequence, at least one value whose absolute value is less than or equal to L as at least one first value.

5. The method according to claim 1, wherein one value in the second sequence corresponds to one bit in the first sequence; and the obtaining the subsequence from the first sequence based on the first value comprises:

reading, from the first sequence, a bit corresponding to the at least one first value as the subsequence.

6. The method according to claim 1, wherein the determining the generator polynomial or the generator matrix based on the subsequence comprises:

adding one bit 1 before the subsequence and after the subsequence to obtain the generator polynomial, wherein the generator polynomial is represented by using a generator polynomial vector.

7. The method according to claim 1, wherein the determining the generator polynomial or the generator matrix based on the subsequence comprises:

reversing the subsequence to obtain a reversed subsequence; and adding one bit 1 before the reversed subsequence and after the reversed subsequence to obtain the generator polynomial, wherein the generator polynomial is represented by using a generator polynomial vector.

8. A channel coding apparatus, comprising a processor and a memory, wherein the memory is configured to store a computer program, and the processor runs the computer program, to cause the apparatus to:

obtain a subsequence based on a first sequence and a second sequence by obtaining a first value in the second sequence and obtaining the subsequence from the first sequence based on the first value;

determine a generator polynomial or a generator matrix based on the subsequence; and perform cyclic code encoding using the generator polynomial or the generator matrix.

9. The apparatus according to claim 8, wherein the processor runs the computer program to further cause the apparatus to:

determine L based on a code length N and an information bit length K, wherein L=N−K, and K, L, and N are positive integers; and read, from the second sequence, a value at a location corresponding to L as a first value M, wherein M is a positive integer.

10. The apparatus according to claim 8, wherein the processor runs the computer program to further cause the apparatus to:

read L−1 bits starting from an $M^{th}$ bit in the first sequence as the subsequence, wherein M is the first value.

11. The apparatus according to claim 8, wherein the processor runs the computer program to further cause the apparatus to:

determine L based on a code length N and an information bit length K, wherein L=N−K−1; and read, from the second sequence, at least one value whose absolute value is less than or equal to L as at least one first value.

12. The apparatus according to claim 8, wherein one value in the second sequence corresponds to one bit in the first sequence; and the processor runs the computer program to further cause the apparatus to:

read, from the first sequence, a bit corresponding to the at least one first value as the subsequence.

13. The apparatus according to claim 8, wherein the processor runs the computer program to further cause the apparatus to:

add one bit 1 before the subsequence and after the subsequence to obtain the generator polynomial, wherein the generator polynomial is represented by using a generator polynomial vector.

14. The apparatus according to claim 8, wherein the processor runs the computer program to further cause the apparatus to:

reverse the subsequence to obtain a reversed subsequence; and separately-add one bit 1 before the reversed subsequence and after the reversed subsequence to obtain the generator polynomial, wherein the generator polynomial is represented by using a generator polynomial vector.

15. A non-transitory computer-readable storage medium storing a computer program that when run on a computer causes the computer to:

obtain a subsequence based on a first sequence and a second sequence by obtaining a first value in the second sequence and obtaining the subsequence from the first sequence based on the first value;

determine a generator polynomial or a generator matrix based on the subsequence; and perform cyclic code encoding using the generator polynomial or the generator matrix.

16. The non-transitory computer-readable storage medium of claim 15, wherein the obtaining the first value in the second sequence comprises:

determining L based on a code length N and an information bit length K, wherein L=N−K, and K, L, and N are positive integers; and reading, from the second sequence, a value at a location corresponding to L as a first value M, wherein M is a positive integer.

17. The non-transitory computer-readable storage medium of claim 15, wherein the obtaining the subsequence from the first sequence based on the first value comprises:

reading L−1 bits starting from an $M^{th}$ bit in the first sequence as the subsequence, wherein M is the first value.

18. The non-transitory computer-readable storage medium of claim 15, wherein the obtaining the first value in the second sequence comprises:

determining L based on a code length N and an information bit length K, wherein L=N−K−1, and K, L, and N are positive integers; and reading, from the second sequence, at least one value whose absolute value is less than or equal to L as at least one first value.

19. The non-transitory computer-readable storage medium of claim 15, wherein one value in the second sequence corresponds to one bit in the first sequence; and the obtaining the subsequence from the first sequence based on the first value comprises:

reading, from the first sequence, a bit corresponding to the at least one first value as the subsequence.

20. The non-transitory computer-readable storage medium of claim 15, wherein the determining a generator polynomial or a generator matrix based on the subsequence comprises:

adding one bit 1 before the subsequence and after the subsequence to obtain the generator polynomial, wherein the generator polynomial is represented by using a generator polynomial vector.

* * * * *